United States Patent [19]

Kuwayama et al.

[11] Patent Number: 5,379,132
[45] Date of Patent: Jan. 3, 1995

[54] DISPLAY APPARATUS FOR A HEAD-UP DISPLAY SYSTEM

[75] Inventors: Tetsuro Kuwayama, Yokohama; Toshiaki Majima, Tokyo; Naosato Taniguchi, Atsugi; Yoko Yoshinaga, Machida; Hiroyoshi Kishi, Atsugi; Nobuo Kushibiki, Yamato, all of Japan

[73] Assignee: Canon Kabushiki Kaisha, Tokyo, Japan

[21] Appl. No.: 924,568

[22] Filed: Aug. 5, 1992

Related U.S. Application Data

[63] Continuation of Ser. No. 588,101, Sep. 25, 1990, abandoned.

[30] Foreign Application Priority Data

Sep. 27, 1989 [JP] Japan ................... 1-251282

[51] Int. Cl.$^6$ ..................... G02B 5/32; G02B 27/10
[52] U.S. Cl. ......................... 359/13; 359/15; 359/630; 345/7
[58] Field of Search ............ 350/3.7, 3.84, 174; 359/13, 14, 630, 631, 632, 13, 14, 868, 866, 15; 340/705, 980; 345/7, 9

[56] References Cited

U.S. PATENT DOCUMENTS

| | | | |
|---|---|---|---|
| 3,580,655 | 5/1971 | Leith | 350/3.5 |
| 3,737,212 | 6/1973 | Antonson et al. | 359/14 |
| 3,834,785 | 9/1974 | Kimura | 350/3.84 |
| 3,936,138 | 2/1976 | Noguchi | 350/3.84 |
| 3,940,204 | 2/1976 | Withrington | 350/3.5 |
| 4,218,111 | 8/1980 | Withrington et al. | 350/3.72 |
| 4,407,564 | 10/1983 | Ellis | 350/3.7 |
| 4,447,128 | 5/1984 | Ferrer | 350/3.7 |
| 4,530,564 | 7/1985 | Close | 350/3.69 |
| 4,613,200 | 9/1986 | Hartman | 350/3.7 |
| 4,669,810 | 6/1987 | Wood | 350/3.7 |
| 4,688,879 | 8/1987 | Fairchild | 350/3.7 |
| 4,763,990 | 8/1988 | Wood | 350/320 |
| 4,768,846 | 9/1988 | Connors et al. | 350/1.1 |
| 4,775,218 | 10/1988 | Wood et al. | 350/174 |
| 4,830,464 | 5/1989 | Cheysson et al. | 350/174 |
| 4,832,427 | 5/1989 | Nanba et al. | 350/3.72 |
| 4,917,485 | 4/1990 | Baldwin | 359/866 X |
| 4,919,517 | 4/1990 | Jost et al. | 350/174 |
| 4,930,847 | 6/1990 | Cederquist | 350/3.6 |
| 4,988,152 | 1/1991 | Wreede | 359/15 |
| 5,005,010 | 4/1991 | Misaki et al. | 350/174 |
| 5,035,473 | 7/1991 | Kuwayama et al. | 350/3.7 |

FOREIGN PATENT DOCUMENTS

| | | |
|---|---|---|
| 0007039 | 1/1980 | European Pat. Off. |
| 216692 | 4/1987 | European Pat. Off. |
| 0278395 | 8/1988 | European Pat. Off. |
| 0286962 | 10/1988 | European Pat. Off. |
| 372824 | 6/1990 | European Pat. Off. |
| 2730635 | 1/1979 | Germany . |
| 61-278820 | 12/1986 | Japan . |
| 2197728 | 5/1988 | United Kingdom . |
| 87-01211 | 2/1987 | WIPO . |

OTHER PUBLICATIONS

Donald H. Close, "Optically Recorded Holographic Optical Elements", Handbook of Optical Holography, pp. 573–585 (1979).

E. Popov, L. Mashev and D. Maystre, "Back-Side Diffraction By Relief Gratings", Optics Communications, Jan. 15, 1988, vol. 65, No. 2, pp. 97–100.

J. & T. Jannson, "Low-Dispersion Holographic Mirrors with Very High Diffraction Efficiency", p. 1257 Optical Society of America, 1984 Annual Meeting.

*Primary Examiner*—William L. Sikes
*Assistant Examiner*—David R. Parsons
*Attorney, Agent, or Firm*—Fitzpatrick, Cella, Harper & Scinto

[57] ABSTRACT

A display apparatus having an image generator and a beam combiner including a hologram for displaying a reduced image by receiving beams from the image generator. A virtual image of an image generated by the image generator is formed in the vicinity of the beam combiner by virtue of the image reductioning function of the beam combiner, so that the displayed image is visible from a wider range of viewing positions.

18 Claims, 2 Drawing Sheets

FIG. 4A  FIG. 4B
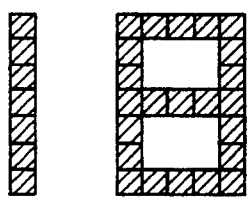
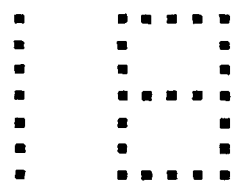
FIG. 5
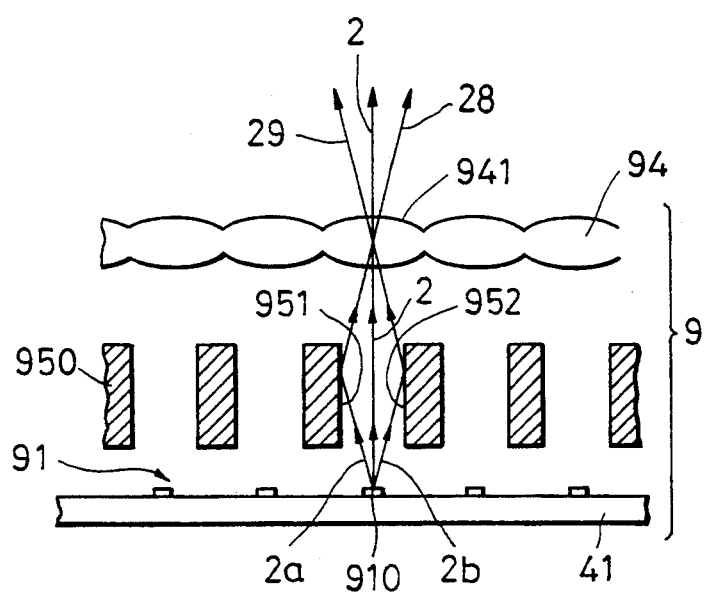
FIG. 6A  FIG. 6B
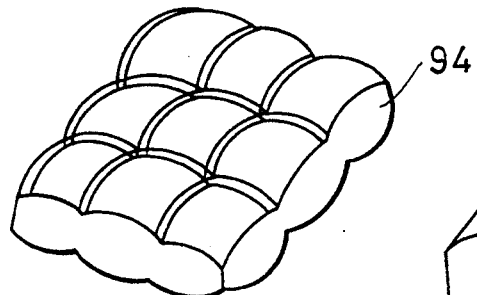
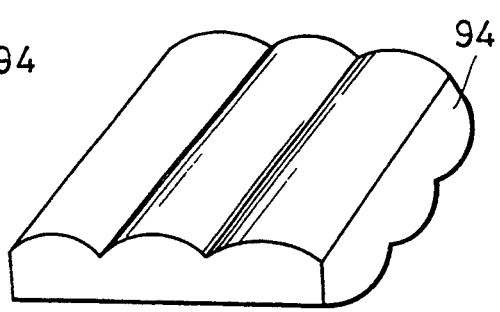

DISPLAY APPARATUS FOR A HEAD-UP DISPLAY SYSTEM

This application is a continuation of application Ser. No. 07/588,101 filed Sep. 25, 1990, now abandoned.

BACKGROUND OF THE INVENTION

The present invention relates to a display apparatus, and more particularly, to a display apparatus of a so-called head-up display system in which predetermined image information is superposed on the scene ahead of the apparatus by means of a beam combiner which has a semitransparent mirror, a hologram and other components, so as to put the image to be observed in a field of view of the observer.

A display apparatus laving a beam combiner which has a hologram is disclosed, for example, in U.S. Pat. No. 4,218,111. This apparatus is mounted, for example, in front of a driver's seat of a vehicle such as an automobile, pilot's seat of an aircraft, and so forth, so as to enable the driver or the pilot to simultaneously observe both the scene and the image information.

FIG. 1 shows a system in which a display apparatus of the kind described is used on an automobile. The apparatus has a hologram 100 which functions as a beam combiner. The hologram 100 is formed on the glass of the front window of the automobile. In this Figure, hatched areas L and R represent, respectively, the regions which can be observed by the left and right eyes of the observer, i.e., the driver, when the hologram 100 is positioned 800 mm ahead of the center 51 of observation. Two elongated circles 51a and 51b show ellipses of the right and left eyes which represent statistical standard positions of the eyes. The ellipses 51a, 51b have sizes of 95 percentile in terms of the definition specified by JIS (Japanese Industrial Standards) D0021.

The ellipses 51a, 51b in FIG. 1 are illustrated on the assumption that the driver's seat is shiftable back and forth by 140 mm. The most preferred condition for display in an automobile is that while area of the display is covered by the regions L and R, it is observable by the left and right eyes corresponding to 95 percentile. It is to be understood, however, that only a limited region where two hatched areas L and R overlap each other is observable by both eyes simultaneously. It is assumed here that the hologram 100 on the front window glass has a width of 100 mm. In such a case, the width of the region 101 observable by two eyes at a plane A which is 100 mm ahead of the hologram 100 is 93 mm. Thus, the width of the region 101 is substantially the same as that of the hologram 100. Thus, when the image information is displayed on the plane A, the driver can observe the image information without moving his head, so that the eclipse of image is avoided even when the hologram has a width which is as small as 100 mm. Hitherto, however, it was impossible to form an image on the plane A, since the known holograms are constructed to serve as a concaved mirror for the purpose of enlarging the image to be displayed. When such a known hologram is used, the image is formed on a plane B which is 400 mm ahead of the front window glass. In this case, the width of the region which can be observed by both eyes is as small as 67 mm. This narrow region can contain only a limited quantity of image information, e.g., three characters or letters. The above-described problems are caused not only by a lateral shift of the observing position but also by a vertical shift of the same. Namely, the observing position, i.e., the positions of the eyes, varies according to the sitting height of the driver and angle of inclination of the seat back. Therefore, in the conventional hologram which has only a limited region of observation in the vertical direction, the driver is often obliged to straighten his upper body or to crouch, in order to observe the image information formed on the plane B.

SUMMARY OF THE INVENTION

Accordingly, a primary object of the present invention is to provide an improved display apparatus having an enlarged region of observation.

To this end, according to a first aspect of the present invention, there is provided a display apparatus comprising an image generator, and a beam combiner having an optical power for displaying a reduced image by receiving a beam from the image generator.

According to a second aspect of the present invention, there is provided a display apparatus comprising an image generator, and a beam combiner having an optical power for reflectively diffracting a beam from the image generator to thereby display a reduced image.

According to a third aspect of the present invention, there is provided a display apparatus comprising an image generator, and a beam combiner having a hologram, the hologram being arranged to serve as a convex mirror so as to reflectively diffract a beam from the image and thereby displaying a reduced image.

In each of the above-described aspects of the present invention, the beam combiner is constructed so as to materially transmit beams from the scene ahead of the display apparatus.

Preferably, the beam combiner is constructed so as to serve as a convex mirror having a radius of curvature ranging between 100 mm and 1600 mm.

In order to attain a brighter display, the beam combiner is preferably comprised by a hologram. Preferably, such a hologram is comprised by a volume phase type diffraction grating. Various types of devices can be used as the image generator, such as a CRT, a liquid crystal light valve, an LED array and a plasma display.

BRIEF DESCRIPTION OF THE DRAWINGS

FIGS. 4A and 4B are illustrations of the images observed by eyes when the display apparatus shown in FIG. 3 is used;

FIG. 5 is an enlarged view of a third embodiment of the display apparatus of the present invention, illustrating particularly an image generator; and FIGS. 6A and 6B are illustrations of lens arrays.

DESCRIPTION OF THE PREFERRED EMBODIMENTS

Figure 1:
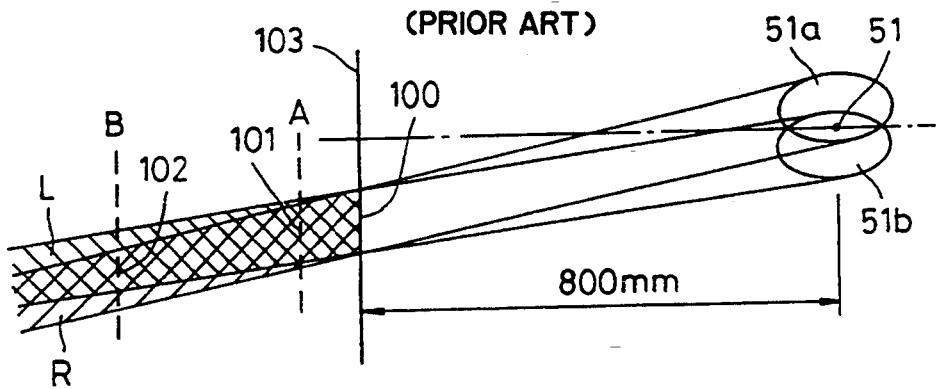
FIG. 1 is a schematic illustration of a conventional head-up display system.
Figure 2:
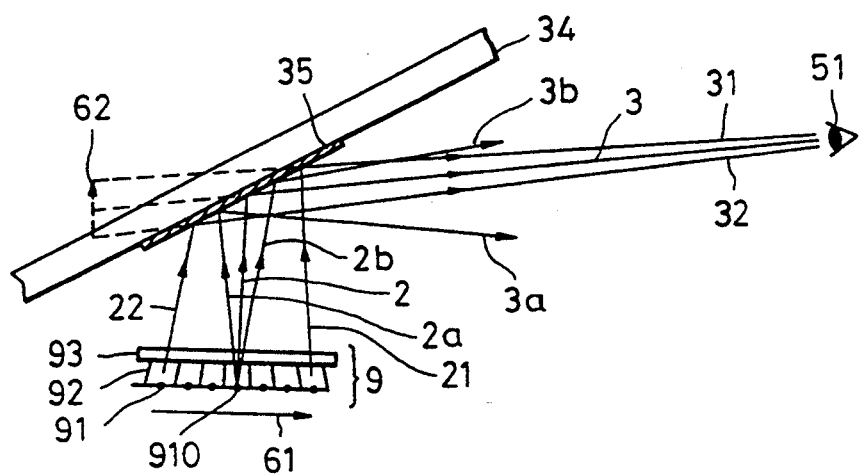
FIG. 2 is a schematic illustration of a first embodiment of the display apparatus in accordance with the present invention.

Referring to FIG. 2, which schematically shows a first embodiment of the present invention, a display means 9, serving as an image generator, has a self-light emitting type display portion 91 for displaying information images, a light-shield array 92 for preventing reduction of image contrast due to incidence of external light to the display portion 91, and a transparent protective plate 93 for protecting the display portion 91 against dust and other contaminants.

The display portion 91 has an array of a plurality of light emitting elements such as LEDs. Numeral 35 designates a beam combined having an optical power. The beam combiner is composed of a light-transmitting reflection type hologram adhered to a transparent substrate 34, which in this case is the front window glass of an automobile. More specifically, the hologram 35 is composed of a volume phase type diffraction grating which functions as an optical element equivalent to a convex mirror having a radius of curvature of 400 mm.

The light rays emitted from a light emitting element 910, which is on the center of the display portion 91, conceptually include three portions: namely, a central beam 2 (principal ray) and two marginal beams 2a and 2b. The central beam 2 is reflectively diffracted by the hologram 35 on the window glass 34 so as to form a beam 3 which impinges upon the pupil 51 of the observer. Similarly, marginal beams 2a and 2b are reflectively diffracted by the hologram 35 to form beams 3a and 3b which are also directed to the pupil 51. Light beams 21 and 22 from marginal light emitting elements of the display portion 91 are reflectively diffracted by the hologram 35 so as to form beams 31 and 32, which also are directed to the observer's pupil 51.

The display portion 91 of the display means 9 is located at a position which is 250 mm apart from the hologram 35 so that a reduced virtual image 62 of an image 61 displayed by the display portion 91 is formed at a position which is about 110 mm apart from the hologram 35. That is, the virtual image 62 is formed at a position which is closer to the hologram 35 than the display portion 91 is.

The position at which the virtual image 62 is formed can be substantially determined by a formula of geometric optics, although the position is preferably corrected slightly in accordance with the values of the incident angle and the diffraction angle of the hologram.

In this embodiment, the light-shield array 92 has a plurality of light-shielding plates, and each light-shielding plate is so arranged with respect to the beam from each light-emitting element such that the wall surface of each light-shielding plate is disposed in the same direction as the beam which is directed to the observer's pupil through the position where oath light-shielding plate is located. In this way, the displayed information can be observed in good condition, without eclipse, from a sufficiently large region centered at the observer's pupil 51.

The light shield array 92 has light-shielding plates 91 which are oriented in different directions according to the positions of the light emitting elements. This arrangement eliminates any difficulty in viewing the displayed image caused when the whole image area is uniformly illuminated by an external light such as solar light.

In the described embodiment of the present invention, the display means 9 is disposed in, for example, an instrument panel of an automobile, while the hologram 35 is disposed on a suitable portion of the front window glass 34. In such a case, the distance between the display means 9 and the hologram 35 is restricted to a small value, e.g., about 350 mm. It is to be understood, however, that the virtual image 62 can be formed at a position which is spaced by a very small distance, e.g., 100 mm or so, from the hologram 35, even wheel the distance between the display means 9 and the hologram 35 is small as described above, provided that the focal distance of the hologram 35 serving as a convex mirror is determined to be $-140$ mm, i.e., 280 mm in terms of radius of curvature, so as to form and display a reduced virtual image 62 as the display image. It is thus possible to enlarge the region from which the observer's eyes can observe the displayed image.

Figure 3:
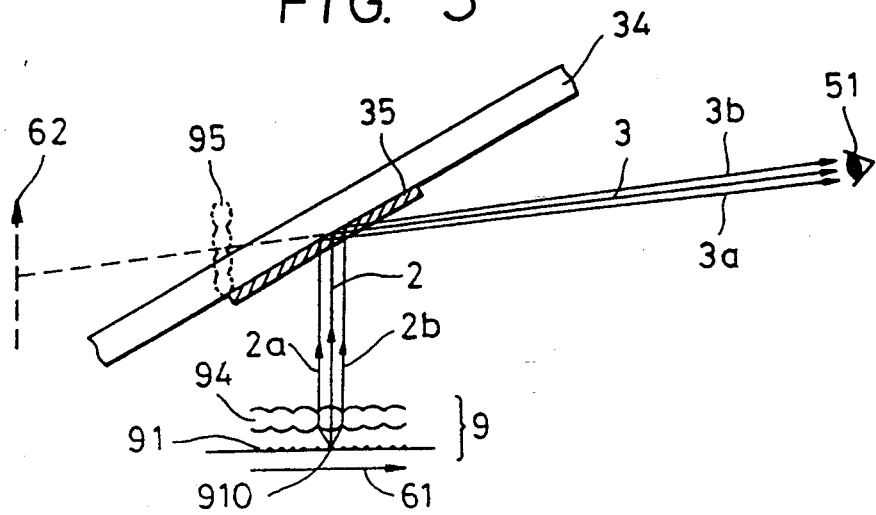
FIG. 3 is a schematic illustration of a second embodiment of the display apparatus in accordance with the present invention.

FIG. 3 schematically shows a second embodiment of the display apparatus of the present invention. In this Figure, the same reference numerals are used to denote the same elements or components as those shown in FIG. 2.

In this embodiment, the display means 9 includes a self-light emitting display portion 91 and a light condensing portion 94 arranged in front of the display portion 91. The light condensing portion 94 includes a fly lens or a single or a plurality of lenticular lenses.

The light rays emitted from the light emitting element 910 which is on the center of the display portion 91 conceptually include three portions: namely, a central beam 2 (principal ray) and two marginal beams 2a and 2b. The central beam 2 is made to impinge upon the hologram 35 through a lens element of the light condensing portion 94 and is reflectively diffracted by the hologram 35 on the window glass 34 so as to form a beam 3 which impinges upon the pupil 51 of the observer. Similarly, marginal beams 2a and 2b are substantially collimated or converged through the lens elements of the light condensing portion 94 and are reflectively diffracted by the hologram 35 to form beams 3a and 3b which are also directed to the pupil 51.

In this embodiment, a reduced virtual image 95 of the light condensing portion 94 is formed in the close proximity of the hologram 35, while the information display image 62, formed by virtual images of dots of the light emitting elements of the display portion 91, is focused at a position relatively far from the hologram 35, e.g., 2 to 3 meters ahead of the hologram 35. The virtual image 95 is formed at a position which is closer to the hologram 35 than the light condensing portion 94.

The positions of the lens elements of the lens array forming the light condensing portion 94 may be suitably offset to the center of the light condensing portion 94, provided that the number of the lens elements corresponds to that of the illuminating elements of the display means. It is also possible to arrange that the number of light-emitting elements is greater by a suitable number than the number of lens elements.

The advantage of the second embodiment will be described with reference to FIGS. 4A and 4B.

FIG. 4A shows an image seen by the observer's eyes when the eyes are focused on the virtual image 95 of the light condensing portion 94 from the position of the pupil 51, while FIG. 4B shows an image seen by the observer's eyes when the eyes are focused on the virtual image 62. The luminance of the image shown in FIG. 4A is comparatively low because the images of dots of the light emitting elements are in an out-of-focus state. In contrast, the image shown in FIG. 4B has much greater luminance than the image of FIG. 4A, although the size of each dot is much smaller. Therefore, image information can be presented with a sufficiently high brightness even against a background of road or outdoor scenery in the daylight, with ordinary LEDs such as of red or green color as the light emitting elements.

In the conventional display apparatus in which the information image is simply formed at a position far from the hologram, the position where the image is displayed is moved a relatively long distance when the observer's pupil 51 is moved to the left and right or up and down. In contrast, in the described embodiment of the display apparatus of the present invention, the image information is located at a position determined by the virtual image 95, i.e., in the close proximity of the front window glass 34, and is not moved a long distance even when the position of the observer's pupil 51 is moved. This prevents so-called sea-sickness which is often experienced with the conventional display apparatus due to unpleasant movement of the image caused by shaking of the automobile body or movement of the driver's body. "Sea-sickness" is almost inevitable when the information image is formed by conventional display apparatus which displays the enlarged image at a remote place by a hologram of a size smaller than 25 mm square.

FIG. 5 is an enlarged view of a display means 9 and associated portions used in a third embodiment which is an improvement of the second embodiment.

Referring to this Figure, a display portion 91 composed of an array of light emitting elements such as LEDs or plasma display elements is formed on a substrate 41. Numeral 94 denotes a light condensing portion composed of a lens array. A plurality of mirror members 950 are disposed between the light condensing portion 94 and the display portion 91. Each mirror member 950 is a parallelepiped member with both side surfaces constituting reflection surfaces corresponding to the light emitting elements. Each reflection surface extends substantially in parallel with the optical axis of each lens element of the lens array. The central beam 2 among the beams 2a, 2, 2b emitted from the light emitting element 910 is projected through a lens 941 while the marginal beams 2a, 2b are reflected by the reflection surfaces 951, 952 on both sides of the mirror members 950 and projected as beams 28 and 29 through the lens 941. These beams 2, 28, 29 are reflectively diffracted by the hologram so as to be directed to the pupil of the observer. In this embodiment, which employs mirror members 950, the effective number of the light emitting elements are increased two to three times by a suitable selection of the positions and angles of the reflective surfaces on both sides of the mirror members 950. When the number of the light-emitting elements is exactly the same as that of the lens elements, the beams may fail to impinge upon the observer's pupil when the observer's head is moved drastically. In the third embodiment as described, however, this problem is overcome because the effective number of the light emitting elements is increased by virtue of the use of the mirror members 950.

FIGS. 6A and 6B show examples of the light condensing portion 94 used in the display means 9 in the second and third embodiments as described above.

Referring first to FIG. 6A, a plurality of square or rectangular small lens elements are arranged regularly and two-dimensionally. Each of the elements has a refraction surface of positive refractive power which is spherical or aspherical. If necessary, the lens element may be designed to have different focal lengths in the lateral and vertical directions of the field of view. These lens elements may be arranged in various patterns. For instance, these elements may be arranged in the form of a parallelogram or a regular triangle.

FIG. 6B shows a two-layered lenticular lens having cylindrical lenses of positive refractive power, e.g., lenses with a circular or oval cross-sections, arranged on the obverse and reverse sides of a transparent substrate such that the direction of the axes of these lenses are orthogonal to each other, thus forming a two-dimensional lens array.

In the known head-up display apparatus of the type described before, the hologram serves as a flat mirror or a concave mirror which forms an image at a remote position. In contrast, in the embodiments of the invention described hereinbefore, the hologram is constructed so as to serve as a convex mirror having a radius of curvature ranging preferably between 100 mm and 2,000 mm, and more preferably between 100 mm and 1600 mm. With this arrangement, when the hologram is used as a beam combiner on a front window glass of an automobile, it is possible to display a reduced information image within a distance between 37,5 mm and 375 mm from the hologram, even when the hologram is disposed at a position which is spaced from the display means by a distance ranging between 150 mm and 600 mm.

Therefore, according to the invention, a very wide region of observation can be obtained even when the hologram is a very small square hologram having a side length of 200 mm or smaller, thus enabling the whole display of information to a wider view area. It is thus possible to obtain a heat-up display apparatus which enables the observer, e.g., a driver of an automobile, to observe the whole image display with both eyes even when the positions of the eyes are moved a relatively large distance.

Furthermore, according to the present invention, the hologram is used as an image reduction system so that the image contrast can be enhanced by a degree corresponding to the reduction rate, thus facilitating recognition of the image.

The hologram 35 can be fabricated as a single sheet of film and adhered to the inner side of tile front window glass by means of, for example, a double-sided adhesive tape. When the conventional hologram is used, a blur or a distorted image is caused unless the hologram is adhered with a high degree of precision. In the present invention, however, any slight inferior adhesion of the hologram does not cause serious blur or distortion because the hologram functions as a convex mirror. Although a hologram is used as the beam combiner in each of the described embodiments, this is not exclusive and the beam combiner may be comprised of another diffraction grating which serves as a convex mirror. It is also possible to use, as the beam combiner, other types of holograms such as a relief hologram, or other types of diffraction grating structures. It will also be clear that the display apparatus of the invention can be used on various types of vehicles, including aircraft, although automotive display apparatuses have been specifically described.

What is claimed is:

1. A head-up display apparatus for use in a transportation vehicle, comprising:
   an image generator for displaying an image, said image generator arranged in the transportation vehicle; and
   an optical system for directing a beam of the image from said image generator to a viewer, said optical system including beam combiner means having the same optical power as a convex mirror for reflectively diffracting beams from said image generator to thereby display a reduced virtual image.

2. A head-up display apparatus according to claim 1, wherein said optical power of said beam combiner means is the same power as a convex mirror having a radius of curvature ranging between 100 mm and 1600 mm.

3. A head-up display apparatus according to claim 1, wherein said beam combiner means includes a hologram for reflectively diffracting the beams from said image generator.

4. A head-up display apparatus according to claim 3, wherein said hologram is a volume phase type and reflective diffraction hologram.

5. A head-up display apparatus according to claim 3, wherein said hologram forms a reduced virtual image of said image generator adjacent said hologram.

6. A head-up display apparatus according to claim 1, wherein said image generator is arranged in front of the viewer.

7. A head-up display apparatus according to claim 1, wherein said beam combiner means forms the reduced image of image generator at a position proximate to said beam combiner means.

8. A head-up display apparatus according to claim 7, wherein the optical path length between the reduced image and said beam combiner means is set to be smaller than that between said image generator and said beam combiner means.

9. A head-up display apparatus according to claim 1, wherein said image generator includes an array of light emitting elements for emitting a plurality of light rays.

10. A head-up display apparatus according to claim 9, wherein said optical system includes a lens array comprising a plurality of lens elements for directing a beam of said image generator to said beam combiner means.

11. A head-up display apparatus according to claim 10, wherein said lens array includes a lenticular lens.

12. A head-up display apparatus according to claim 10, wherein said lens array includes a fly-eye lens.

13. A head-up display apparatus according to claim 10, wherein said lens array is disposed adjacent to said array of light emitting elements.

14. A head-up display apparatus according to claim 10, wherein said image generator includes a mirror array comprising a plurality of mirror elements disposed between said lens array of light emitting elements, with each said mirror element having reflection surfaces substantially parallel to the optical axes of said lens array.

15. A head-up display apparatus according to claim 10, wherein said image generator includes an array of light-shielding elements, disposed between said lens array and said array of light emitting elements.

16. A head-up display apparatus according to claim 10, wherein said beam combiner means forms a virtual image of said lens array at a position adjacent to said beam combiner means.

17. A method of displaying an image through a frontglass of a means of transportation, said method comprising the steps of:

directing a beam emitted from an image generator arranged in the transportation means toward an optical system including a beam combiner, the beam combiner having the same optical power as a convex mirror for reflectively diffracting beams from the image generator so as to display a reduced virtual image;

combining images from the image generator and a normal field of view by the beam combiner; and displaying the combined images for a viewer through the beam combiner.

18. A display apparatus according to claim 17, wherein the optical power of said beam combiner means is the same power of a convex mirror having a radius of curvature ranging between 100 mm and 1600 mm.

* * * * *

UNITED STATES PATENT AND TRADEMARK OFFICE
CERTIFICATE OF CORRECTION

PATENT NO. : 5,379,132
DATED : January 3, 1995
INVENTOR(S) : Kuwayama, et al.

It is certified that error appears in the above-indentified patent and that said Letters Patent is hereby corrected as shown below:

COLUMN 1:

Line 17, "laving" should read --having--.
   Line 59, "concaved" should read --concave--.

COLUMN 3:

Line 6, "combined" should read --combiner--.
   Line 47, "oath" should read --each--.
   Line 68, "wheel" should read --when-- and "so,from" should read --so, from--.

COLUMN 5:

Line 3, ". and" should read --and--.

COLUMN 6:

Line 16, "37,5mm" should read --37.5 mm--.

Signed and Sealed this

Twentieth Day of June, 1995

Attest:

BRUCE LEHMAN

*Attesting Officer*  *Commissioner of Patents and Trademarks*